United States Patent [19]

Tickle

[11] 4,018,311
[45] Apr. 19, 1977

[54] ROTOR AND BRAKING RING DISC ASSEMBLY

[75] Inventor: Colin John Frederick Tickle, Birmingham, England

[73] Assignee: Girling Limited, Birmingham, England

[22] Filed: Nov. 13, 1975

[21] Appl. No.: 631,638

[30] Foreign Application Priority Data

Dec. 20, 1974 United Kingdom ............ 55217/74

[52] U.S. Cl. .......................................... 188/218 XL
[51] Int. Cl.² ........................................ F16D 65/12
[58] Field of Search .................. 188/73.2, 218 XL; 192/107 M

[56] References Cited

UNITED STATES PATENTS

| | | | |
|---|---|---|---|
| 2,485,082 | 10/1949 | Bachman | 188/218 XL |
| 2,541,979 | 2/1951 | Amundsen | 192/107 R |
| 2,902,130 | 9/1959 | Halberg et al. | 188/218 XL |
| 3,295,641 | 1/1967 | Eaton et al. | 188/218 XL |
| 3,530,960 | 9/1970 | Otto et al. | 192/107 R |
| 3,877,551 | 4/1975 | Gebhardt et al. | 188/218 XL |
| 3,939,946 | 2/1976 | Pierre et al. | 188/218 XL |

Primary Examiner—Trygve M. Blix
Assistant Examiner—Edward R. Kazenske
Attorney, Agent, or Firm—Scrivener Parker Scrivener and Clarke

[57] ABSTRACT

In a railway disc brake, a plurality of arcuate elements or segments of a braking ring are attached to the rotor so that each element or segment can thermally expand and contract relative to the rotor, and pairs of circumferentially spaced locating abutments are provided for preventing radial inward and outward movement of the element or segment relative to the rotor at predetermined locations which are selected so that when the element undergoes thermal expansion or contraction with respect to the rotor there is no movement of the element into or out of engagement with the abutments. The abutments may take the form of radial projections on the element or segment or rotor, which projections are urged into engagement with a groove in the rotor or disc element, respectively by further abutments, such as in the form of camming wedges or springs. Alternatively the abutments may be lateral projections on the rotor which are a sliding fit in elongated grooves in the element or segment.

11 Claims, 9 Drawing Figures

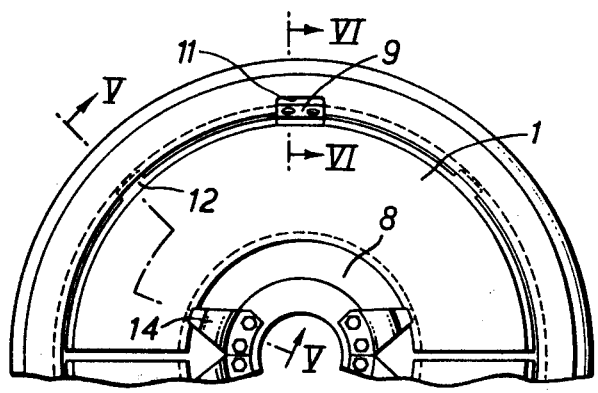
FIG. 4.
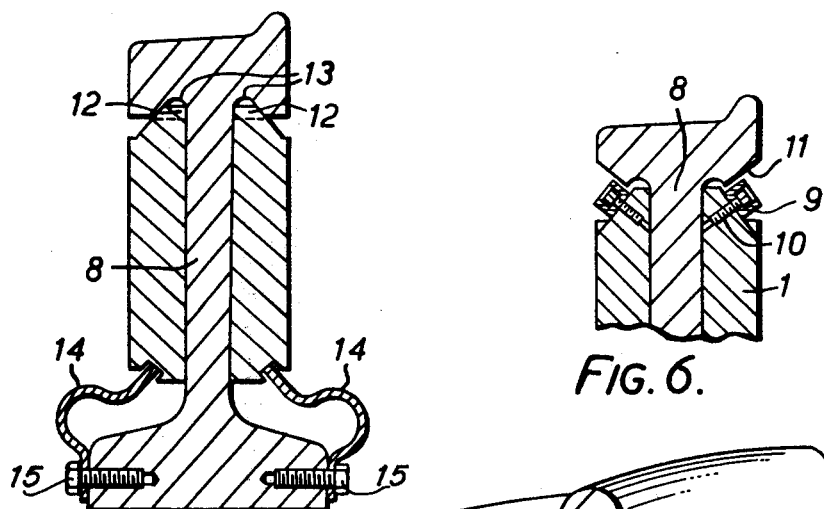
FIG. 5.
FIG. 6.
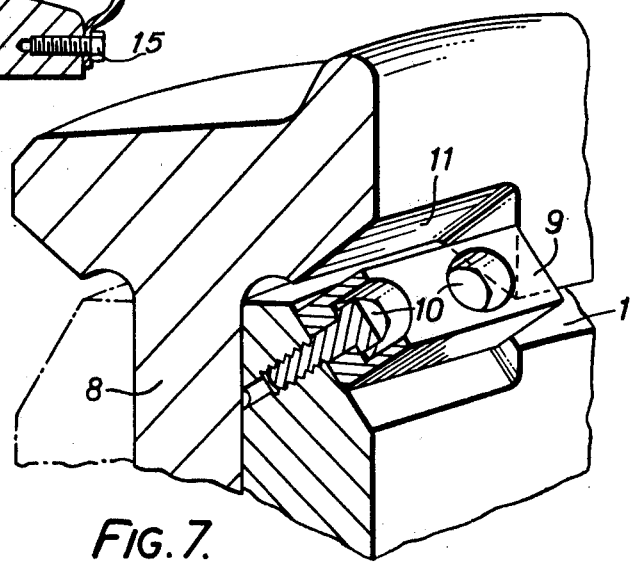
FIG. 7.

ROTOR AND BRAKING RING DISC ASSEMBLY

This invention relates to disc brakes and more particularly to a disc brake assembly including a braking ring secured to a rotor, such as a railway vehicle support wheel.

It is known to mount braking rings on either side of a rotor by bolts which pass through apertures in the rotor, for example as described in our earlier British Pat. No. 1,136,426. To accommodate thermal expansion and contraction of the braking rings, or cheek discs as they are sometimes called, relative to the rotor, the bolts have a substantial clearance through the holes in the rotor and are tightened to such an extent that the frictional engagement between the rings and the rotor transmits braking load, but at the same time permits relative movement between the rings and rotor due to any differential thermal expansion and contraction.

The holes required in the rotor by this known disc brake construction can have the attendant disadvantage of weakening the rotor and providing potential origins for flaws.

The present invention aims at obviating the need for holes in the rotor and is based upon the realisation that when a part-annular member undergoes uniform thermal expansion, while held against two fixed points at its outer periphery, there are two fixed points adjacent the inner periphery of the member relative to which the member moves in such a manner that it is always substantially in radial contact with these two points.

In accordance with the present invention there is provided a railway disc brake assembly comprising a rotor, a braking ring comprising a plurality of arcuate segments or elements mounted on the rotor, means for preventing circumferential movement of each element or segment relative to the rotor about the axis thereof, first abutment means for preventing radially outward movement of the ring element relative to the rotor at a first pair of circumferentially spaced locations, second abutment means for preventing radially inward movement of the ring element relative to the rotor at a second pair of circumferentially spaced locations, the first and second abutment means being so positioned that when the element undergoes thermal expansion or contraction relative to the rotor there is substantially no movement of the element into or out of engagement with the abutment means.

With this construction each element or segment can be positively retained on the rotor by the abutment means and hence bolts passing through holes in the rotor are not essential. Furthermore since the engagement between the element and the abutments is substantially maintained at all times, the abutments effectively position the element on the rotor and prevent it being displaced to an eccentric position to the rotor, which would create out-of-balance forces.

Many different constructional forms of abutment are suitable, as will become apparent from the following description of some embodiments of the invention, given by way of example and with reference to the accompanying drawings, in which:

FIG. 4 is an elevational view of a second brake assembly embodying the invention;

FIG. 5 is a section taken along the line V—V of FIG. 4;

FIG. 6 is a section taken along the line VI—VI of FIG. 4;

FIG. 7 is a detail of FIG. 4 taken along the line VI—VI and shown in perspective;

Figure 1:
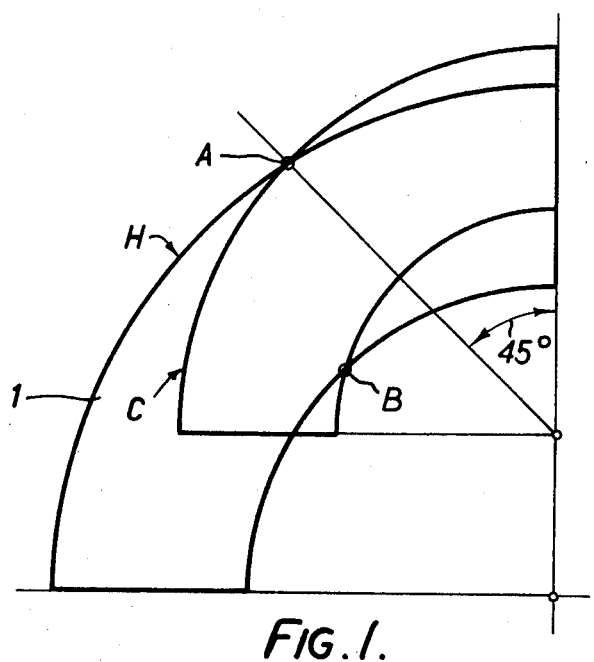
FIG. 1 is a sketch illustrating the basic theory underlying the invention.

The physical phenomenon behind the invention will be explained with reference to FIG. 1 in which one half of a semi-annular braking ring element 1 is illustrated in a cold condition C and superimposed in a hot condition H, the element being held against a pair of symmetrically disposed fixed stops A (only one shown) during uniform thermal expansion between the cold and hot conditions. For purposes of clarity only, the expansion of the element is shown grossly exaggerated.

The fixed stops A are shown to be initially at a 45° position relative to the cold element, but this is not essential and other positions for the stops could be chosen.

It will be seen that a fixed point B lies on the inner periphery of the element in both the hot and cold conditions, and in fact an abutment located at B will remain substantially in contact with the element throughout the entire range of expansion. A second point B will also be present adjacent the half of element 1 not shown, the two fixed points B being symmetrically located.

Thus, if the element is held against circumferential displacement relative to a supporting rotor, it can be maintained centred on the rotor by abutments located at positions A and B. It should be understood that the positions of the abutments are so chosen in the practical arrangements to be described.

Figure 2:
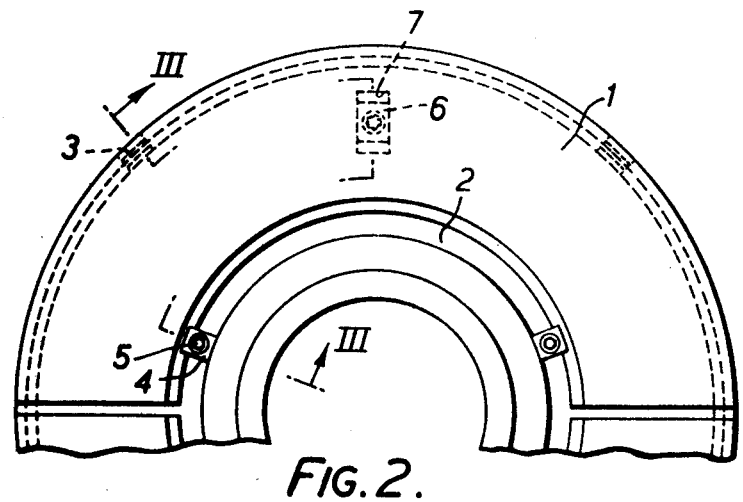
FIG. 2 is an elevational view of a brake assembly in accordance with the invention.
Figure 3:
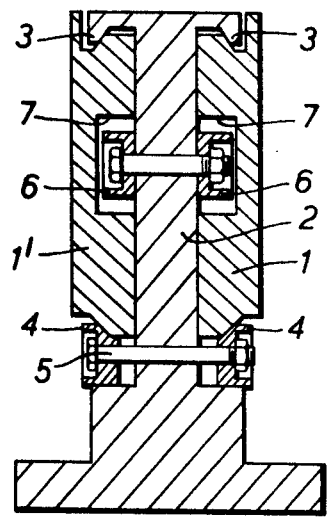
FIG. 3 is a section taken along the line III—III of FIG. 2.

In the assembly shown in FIGS. 2 and 3 braking ring elements or segments 1 and 1' are attached to opposite sides of a rotor 2 by abutments 3 integrally formed on the periphery of the rotor which engage in correspondingly shaped recesses in the ring element peripheries, and by abutment member 4 in the form of wedges bolted together by a bolt 5 which extends through the rotor. Tightening the bolt 5 causes the wedges to act on the tapered inner peripheries of the ring elements and urge the elements outwardly into engagement with the outer abutments 3. If there is any axial expansion of the elements relative to the rotor at the abutments, due to thermal effects this can be accommodated by slight stretching of the bolt 5.

The disc elements are restrained against circumferential movement relative to the rotor by projection members 6 bolted to the rotor and received in radially elongated recesses 7 in the inner faces of the disc elements.

In the assembly of FIGS. 4 to 7 circumferential displacement of the disc element 1 relative to the rotor, in this case a railway vehicle support wheel 8, is prevented by a key member 9 which is fastened to the ring element by bolts 10 and is received in a cooperating recess 11 in the periphery of the wheel. A radial clearance is left between the key member 9 and the wheel rim so that it does not interfere with expansion of the element.

The cheek disc element is formed with radially outwardly directed projections 12 which engage in a correspondingly shaped circumferential groove 13 in the wheel, the projections being urged into the groove by inner abutment members in the form of spring keeper plates 14. The spring keeper plates are anchored to the wheel by bolts 15 and also act to press the ring elements axially into contact with the wheel.

Figure 8:
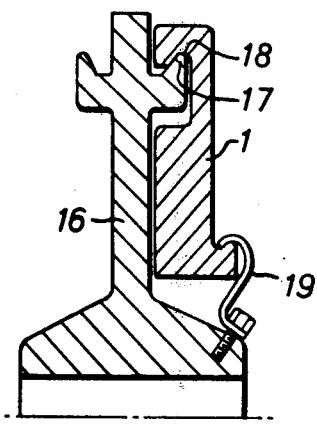
FIG. 8 is an axial section through another disc brake assembly embodying the invention.

The rotor 16 shown in FIG. 8 has an integral local abutment projection 17 and the disc element or segment 1 has a correspondingly shaped undercut recess in the form of a groove 18, the element being urged radially inwards into cooperation with the projection by a spring keeper plate 19 which is bolted to the wheel and engages a shoulder on the element.

Figure 9:
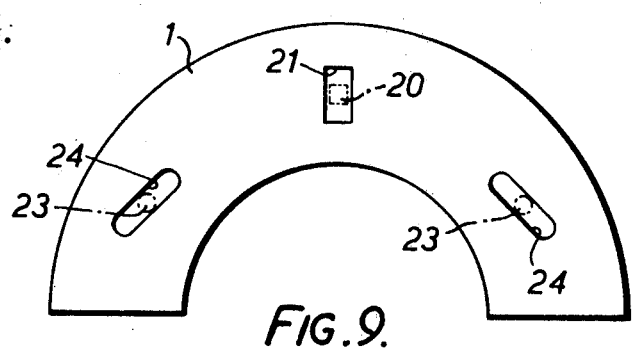
FIG. 9 shows an alternative form of assembly in elevation.

In the disc brake assembly of FIG. 9 a projection 20 on the rotor engages in a radially elongated slot 21 in the ring element to prevent rotation of the element relative to the rotor, in the same manner as the projection 6 of the embodiment of FIG. 2 described above. Two additional projections 23 on the rotor are slidably received in slots 24 in the disc element the arrangement being such that when the disc element expands and contracts relative to the rotor the slots are moved to and fro relative to the projections. The engagement between the projections and the inner and outer sides of the slots defines first and second pairs of abutments respectively which serve to maintain the element centred on the rotor.

Many different slot formations may be suitable to achieve the desired results, but in practice the slots would normally be so arranged that the disc movement with thermal expansion does not become excessive locally. Slot arrangements securing this desired effect include those where the slots are symmetrically positioned on the element, and lie on radii subtending an angle of 90°. The slots may extend along the radii, or be substantially aligned with each other (i.e. being disposed at 45° to the respective radii) or extend at approximately 90° to the respective radii.

What I claim is:

1. A railway disc brake assembly comprising a rotor, a braking ring comprising a plurality of arcuate segments, and means attaching said ring to said rotor in a manner permitting thermal expansion and contradiction of said ring relative to said rotor, said attaching means including anchor means for preventing circumferential movement of said ring relative to said rotor and first and second pairs of circumferentially spaced abutment means on said rotor for each of said segments engaging each of said segments only at first and second pairs of circumferentially spaced locations so as to prevent radially outward and inward movement of each of said segments relative to said rotor at said locations, the first and second circumferentially spaced locations being selected so that said abutment means engage each of said segments at those circumferentially spaced positions thereof having substantially no movement relative to said rotor when said segment undergoes thermal expansion or contraction relative to said rotor whereby there is substantially no movement by said segment into or out of engagement with said abutment means when said segment undergoes said thermal expansion or contraction.

2. An assembly according to claim 1 wherein said anchor means permits free radial movement of each of said segments relative to said rotor.

3. As assembly according to claim 2 wherein said anchor means comprises a projection on said rotor for each said segments and means defining a radially elongated recess having opposed side walls in each said segment, each said projection being received in said corresponding recess with a close fit between said opposed side walls of said recess.

4. An assembly according to claim 2 wherein said anchor means comprises a projection on each said segment, and means defining a recess for each said projection in said rotor, said projection being received for radial sliding movement in said corresponding recess.

5. An assembly according to claim 1 wherein said anchor means is located on an arcuate mid-plane of each said segment.

6. An assembly according to claim 1 wherein said first pair of abutment means comprise radial projections on said rotor adjacent the outer periphery of each said segment, and each said segment has means defining a peripheral recess therein, said projections engaging in said recess.

7. An assembly according to claim 1 wherein said first abutment means comprise means defining an arcuate recess in said rotor, each said segment having a pair of radial projections on the outer periphery thereof, and said projections engaging in said arcuate recess.

8. An assembly according to claim 1 wherein said second pair of abutment means comprise spring members mounted on said rotor to urge each said segment into engagement with said first pair of abutment means.

9. An assembly according to claim 8, wherein said spring members are rigidly attached to said rotor and have free ends engaged with each said segment.

10. An assembly according to claim 1 wherein said second pair of abutment means comprise a pair of wedge members, each said segment having a wedge surface with which said wedge member co-operate to push said segment into engagement with said first abutment means.

11. An assembly according to claim 1 wherein said first pair of locations and said second pair of locations are each symmetrically located on opposite sides of an arcuate mid-plane of each said segment.

* * * * *